(12) United States Patent
Ogino

(10) Patent No.: US 8,562,141 B2
(45) Date of Patent: Oct. 22, 2013

(54) LIGHT-SOURCE APPARATUS AND PROJECTOR

(75) Inventor: Hiroshi Ogino, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 52 days.

(21) Appl. No.: 13/430,961

(22) Filed: Mar. 27, 2012

(65) Prior Publication Data

US 2012/0249974 A1 Oct. 4, 2012

(30) Foreign Application Priority Data

Mar. 28, 2011 (JP) ................................. 2011-070897

(51) Int. Cl.
*G03B 21/14* (2006.01)
*G03B 21/20* (2006.01)
*G02B 5/22* (2006.01)

(52) U.S. Cl.
USPC .................. 353/38; 353/84; 353/85; 359/889

(58) Field of Classification Search
USPC ......... 353/30–31, 38, 84–85, 94, 98–99, 122; 359/885–887, 889–892; 315/360
See application file for complete search history.

(56) References Cited

U.S. PATENT DOCUMENTS

| | | | | |
|---|---|---|---|---|
| 6,252,636 B1* | 6/2001 | Bartlett | ......................... | 348/743 |
| 6,874,893 B2* | 4/2005 | Park | ................... | 353/84 |
| 7,072,096 B2* | 7/2006 | Holman et al. | ............... | 359/298 |
| 7,357,513 B2* | 4/2008 | Watson et al. | .................. | 353/31 |
| 7,733,310 B2* | 6/2010 | Hajjar et al. | .................... | 345/84 |
| 7,791,561 B2* | 9/2010 | Hajjar et al. | ..................... | 345/32 |
| 8,002,413 B2* | 8/2011 | Narikawa | ......................... | 353/37 |
| 8,052,279 B2* | 11/2011 | Wang et al. | ..................... | 353/31 |
| 8,157,398 B2* | 4/2012 | Yamamoto | ...................... | 362/84 |
| 8,167,440 B2* | 5/2012 | Sato et al. | ...................... | 353/99 |
| 8,231,227 B2* | 7/2012 | Kurosaki | ......................... | 353/31 |
| 8,393,741 B2* | 3/2013 | Fukano | ............................ | 353/85 |
| 8,408,775 B1* | 4/2013 | Coleman | ........................ | 362/615 |
| 2004/0080938 A1* | 4/2004 | Holman et al. | ................ | 362/231 |
| 2004/0225222 A1* | 11/2004 | Zeng et al. | .................... | 600/476 |

(Continued)

FOREIGN PATENT DOCUMENTS

| JP | 6-265881 A | 9/1994 |
|---|---|---|
| JP | 2002-372701 A | 12/2002 |

(Continued)

OTHER PUBLICATIONS

Japanese Office Action dated Jan. 15, 2013 (and English translation thereof) in counterpart Japanese Application No. 2011-070897.

*Primary Examiner* — Tony Ko
*Assistant Examiner* — Jori S Reilly-Diakun
(74) *Attorney, Agent, or Firm* — Holtz, Holtz, Goodman & Chick, PC (57) ABSTRACT

A projection apparatus includes a fluorescence plate including a fluorescence layer configured to emit fluorescence light beams upon irradiation of the excitation lights, a first lens array, provided on a light source side of the fluorescence plate and including a plurality of lenses arranged in an array to correspond with the light-emitting elements, and configured to collect the fluorescence light beams and emit the fluorescence light beams to be parallel with one another, and a projection unit configured to form an optical image using the fluorescence light beams obtained via the first lens array and project the optical image on a projection object.

10 Claims, 8 Drawing Sheets

(56) References Cited

U.S. PATENT DOCUMENTS

| | | | | |
|---|---|---|---|---|
| 2006/0221021 | A1* | 10/2006 | Hajjar et al. | 345/84 |
| 2006/0221022 | A1* | 10/2006 | Hajjar | 345/84 |
| 2006/0244929 | A1* | 11/2006 | Sawai et al. | 353/84 |
| 2006/0268231 | A1* | 11/2006 | Gil et al. | 351/221 |
| 2007/0014318 | A1* | 1/2007 | Hajjar et al. | 372/9 |
| 2009/0034284 | A1* | 2/2009 | Li et al. | 362/554 |
| 2009/0262308 | A1* | 10/2009 | Ogawa | 353/31 |
| 2009/0284148 | A1* | 11/2009 | Iwanaga | 313/506 |
| 2010/0079730 | A1 | 4/2010 | Shibasaki | |
| 2010/0149496 | A1* | 6/2010 | Inoue | 353/98 |
| 2010/0245777 | A1* | 9/2010 | Ogura | 353/38 |
| 2010/0328554 | A1* | 12/2010 | Shibasaki | 348/760 |
| 2010/0328617 | A1* | 12/2010 | Masuda | 353/31 |
| 2010/0328625 | A1* | 12/2010 | Miyazaki et al. | 353/85 |
| 2010/0328627 | A1* | 12/2010 | Miyazaki | 353/85 |
| 2010/0328628 | A1* | 12/2010 | Masuda | 353/85 |
| 2010/0328632 | A1* | 12/2010 | Kurosaki et al. | 353/98 |
| 2010/0328765 | A1* | 12/2010 | Dohi et al. | 359/385 |
| 2011/0043765 | A1* | 2/2011 | Shibasaki | 353/31 |
| 2011/0051102 | A1* | 3/2011 | Ogura et al. | 353/85 |
| 2011/0063581 | A1* | 3/2011 | Iwanaga | 353/31 |
| 2011/0075103 | A1* | 3/2011 | Ogawa et al. | 353/31 |
| 2011/0075106 | A1* | 3/2011 | Shibasaki | 353/31 |
| 2011/0096296 | A1* | 4/2011 | Ogawa | 353/31 |
| 2011/0096297 | A1* | 4/2011 | Ogino et al. | 353/31 |
| 2011/0096300 | A1* | 4/2011 | Shibasaki | 353/85 |
| 2011/0109529 | A1* | 5/2011 | Hajjar et al. | 345/32 |
| 2011/0141150 | A1* | 6/2011 | Hajjar et al. | 345/690 |
| 2011/0234998 | A1* | 9/2011 | Kurosaki | 353/85 |
| 2011/0242497 | A1* | 10/2011 | Fukano | 353/31 |
| 2011/0242502 | A1* | 10/2011 | Shibasaki | 353/84 |
| 2011/0292349 | A1* | 12/2011 | Kitano et al. | 353/31 |
| 2011/0304831 | A1* | 12/2011 | Yoshigai | 353/85 |
| 2011/0317131 | A1* | 12/2011 | Miyazaki | 353/31 |
| 2012/0026472 | A1* | 2/2012 | Masuda | 353/85 |
| 2012/0075591 | A1* | 3/2012 | Ogura et al. | 353/31 |
| 2012/0127435 | A1* | 5/2012 | Kitano et al. | 353/20 |
| 2012/0140185 | A1* | 6/2012 | Masuda | 353/31 |
| 2012/0147331 | A1* | 6/2012 | Miyazaki | 353/31 |
| 2012/0242963 | A1* | 9/2012 | Ohta | 353/52 |
| 2012/0262677 | A1* | 10/2012 | Ogino et al. | 353/31 |
| 2012/0268917 | A1* | 10/2012 | Kitano et al. | 362/84 |
| 2012/0300178 | A1* | 11/2012 | Sugiyama et al. | 353/31 |
| 2012/0327377 | A1* | 12/2012 | Ohsugi | 353/38 |
| 2013/0057834 | A1* | 3/2013 | Yoshida | 353/38 |
| 2013/0135593 | A1* | 5/2013 | Saitou | 353/31 |

FOREIGN PATENT DOCUMENTS

| | | |
|---|---|---|
| JP | 2009-056287 A | 3/2009 |
| JP | 2010-102300 A | 5/2010 |
| JP | 2010-164846 A | 7/2010 |
| JP | 2010-272607 A | 12/2010 |

* cited by examiner

LIGHT-SOURCE APPARATUS AND PROJECTOR

CROSS-REFERENCE TO RELATED APPLICATIONS

This application is based upon and claims the benefit of priority under 35 USC 119 of Japanese Patent Application No. 2011-070897 filed on Mar. 28, 2011, the entire disclosure of which, including the description, claims, drawings, and abstract, is incorporated herein by reference in its entirety.

BACKGROUND OF THE INVENTION

1. Field of the Invention

The present invention relates to a projection apparatus suitable for a Digital Light Processing (DLP) (a registered trademark) projector apparatus using semiconductor light-emitting elements.

2. Description of the Related Art

In order to reduce thermal damage to a fluorescence layer remarkably even if a beam-light-based excitation source is modified to produce a higher power, the technique for causing a motor and a crank mechanism to swing a fluorescence wheel on which a plurality of fan-shaped fluorescence substances have been arranged and its rotary drive unit so as to cyclically move the position of a fluorescence substance irradiated with beam light has been considered as disclosed in, for example, Jpn. Pat. Appln. KOKAI Publication No. 2010-164846.

In the technique written in the above patent document, the position on a fluorescence layer in which a spot of beam light is cast is moved, thereby preventing the fluorescence layer from being damaged thermally. This type of projector has always been requested to improve the brightness of a projected image more by modifying the semiconductor light-emitting element used as a light source to produce a higher power. However, to satisfy the request by the technique written in the patent document, the mechanical structure of the apparatus has to be made larger and more complicated. Therefore, there is a limit to satisfying the request.

BRIEF SUMMARY OF THE INVENTION

According to one aspect of the present invention, there is provided a projection apparatus comprising: a light source including a plurality of light-emitting elements arranged in an array and configured to emit excitation lights; a fluorescence plate including a fluorescence layer configured to emit fluorescence light beams upon irradiation of the excitation lights; a first lens array, provided on a light source side of the fluorescence plate and including a plurality of lenses arranged in an array to correspond with the light-emitting elements, and configured to collect the fluorescence light beams and emit the fluorescence light beams to be parallel with one another; and a projection unit configured to form an optical image using the fluorescence light beams obtained via the first lens array and project the optical image on a projection object.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

In an embodiment, the present invention has been applied to a DLP (a registered trademark) data projector apparatus.

Figure 1:
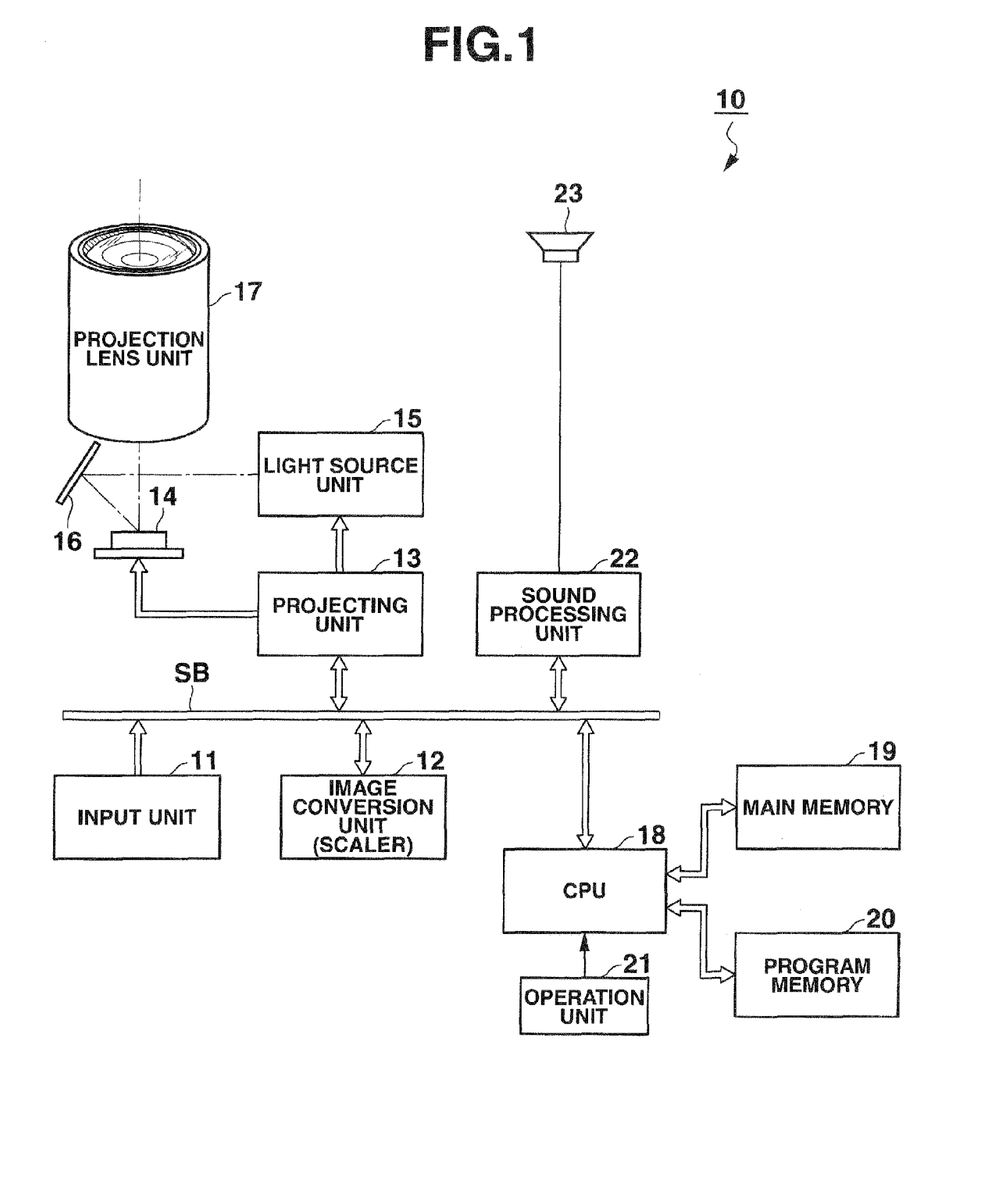
FIG. 1 is a block diagram schematically showing a functional configuration of a data projector apparatus according to an embodiment.

FIG. 1 schematically shows a functional configuration of the data projector apparatus 10 according to the embodiment.

An input unit 11 includes, for example, pin jack (RCA) video input terminals, D-sub15 RGB input terminals, and the like. Analog image signals complying with various standards input to the input unit 11 are digitized at the input unit 11 and then sent to an image conversion unit 12 via a system bus SB.

The image conversion unit 12, which is also referred to as a scaler, standardizes input image data into image data in a specific format suitable for projection and sends the resulting data to a projecting unit 13.

At this time, the image conversion unit 12 superimposes such data as symbols representing various operating states for On-Screen Display (OSD) on image data as needed and sends the resulting image data to the projecting unit 13.

The projecting unit 13 drives a micromirror element 14, a spatial light modulation device, according to the received image data by faster time-division driving achieved by multiplying a frame rate according to a specific format, such as 60 frames/second, the number of divisions of color components, and the number of display gradations together.

The micromirror element 14 turns on and off, at a high speed, the inclination angle of each of a plurality of micromirrors, such as a WXGA (Wide eXtended Graphic Array) (1280 pixels in width×800 pixels in height), arranged in an array to display an image, thereby forming an optical image by its reflected light.

On the other hand, the light source unit 15 emits a plurality of color source light beams, including R, G, B primary color light beams, in time division cyclically. The source light beams from the light source unit 15 are totally reflected by a mirror 16 and are shed on the micromirror element 14.

Then, an optical image is formed by the reflected light at the micromirror element 14. The formed optical image passes through a projection lens unit and is projected and displayed on a screen (not shown) as a projection object.

A CPU 18 controls all the operations of the above circuits. The CPU 18 is connected directly to a main memory 19 and a program memory 20. The main memory 19, which includes, for example, an SPAN, functions as a working memory of the CPU 18. The program memory 20, which includes an electrically rewritable nonvolatile memory, stores operation programs executed by the CPU 18, various types of data, and others. The CPU 18 performs control operations of the data projector apparatus 10, using the main memory 19 and program memory 20.

The CPU 18 performs various projection operations according to a key operation signal from an operation unit 21.

The operation unit 21 includes a key operation unit provided on the body of the data projector apparatus 10 and an infrared-ray receiving unit that receives infrared rays from a remote controller (not shown) dedicated for the data projector apparatus 10. The operation unit 21 directly outputs, to the CPU 18, a key operation signal based on a key operated by the user on the key operation unit of the body or on the remote controller.

In addition, the CPU 18 is also connected to a sound processing unit 22 via the system bus SB. The sound processing unit 22, which includes a sound-source circuit, such as a PCM sound source, converts audio data supplied in a projecting operation into analog data, drives a speaker unit 23 to produce an amplified sound or a beep sound or the like as needed.

[First Configuration of the Light Source Unit]

A configuration of the optical system when the light source unit 15 is configured by three types of light-emitting elements will be explained with reference to FIG. 2.

A light source unit 15-1 includes a light-emitting diode (LED) 31 that emits red light as source light. The red light emitted by the LED 31 passes through lenses 32, 33 that function as collimator lenses and further passes through dichroic mirrors 34, 35, and then reaches the mirror 16 via a lighting lens array 36 and a field lens 37.

The red light reflected by the mirror 16 passes through a field lens 38 and is shed on the micromirror element 14. A red optical image formed by the reflected light from the micromirror element 14 passes through the field lens 38 and is projected on a screen (not shown) by the projection lens unit 17.

The light source unit 15-1 further includes an LED 39 that emits blue light as source light and an LED (laser diode or semiconductor laser) array 42 that emits blue light for exciting green light.

The blue light emitted by the LED 39 passes through lenses 40, 41 that function as collimator lenses, is reflected by the dichroic mirror 34, passes through the dichroic mirror 35, and then reaches the mirror 16 via the lighting lens array 36 and field lens 37.

In the LD array 42, for example, 6×6 LDs (in the vertical direction in FIG. 7), a total of 36 LDs, are arranged in an array. Blue laser light beams emitted by the LD array 42 pass through a lens array 43 (a second lens array), which magnifies each light flux. The magnified light fluxes pass through the dichroic mirror 35 and are shed on a fluorescence plate 45 via a lens array 44 (a first lens array) that is configured so as to have the same arrangement as that of the LD array 42 to face the LD array 42.

The lens array 43 fine-adjusts the direction in which each light beam emitted from the corresponding LD of the LD array 42 travels. These light beams enter the individual lenses of the lens array 44 suitably in the form of parallel light beams, which increases the light focusing efficiency.

The fluorescence plate 45 is arranged such that the fluorescence layer 70 lies substantially in the focal position of the lens array 44.

The fluorescence plate 45 is a plate-like transparent member. The fluorescence layer 70 is formed over the entire surface of the fluorescence plate 45. Specifically, as for the entire surface of the fluorescence layer 70 of the fluorescence plate 45, fluorescence substances are applied to the surface to be irradiated with blue laser beams from the LD array 42 to form the fluorescence layer 70. On the back side of the surface on which the fluorescence layer 70 has been formed, a reflecting plate is provided so as be on top of the fluorescence layer 7C. That is, when the fluorescence layer 70 of the fluorescence plate 45 is irradiated with blue laser beams from the LD array 42, the fluorescence layer 70 is excited and emits green fluorescence emission light as light with a desired wavelength. This green fluorescence emission light is also used as source light.

The green light beams, diffusion light beams, emitted from the fluorescence plate 45 are uniformly directed by the reflecting plate formed on the back side of the fluorescence plate 45 toward the lens array 44, and are collected by the lens array 44 to form substantially parallel light fluxes, which are then reflected by the dichroic mirror 35. After that, the green light beams pass through the lighting lens array 36 and field lens 37 and reach the mirror 16.

As described above, the dichroic mirror 34 allows red light, to pass through and reflects blue light. The dichroic mirror 35 allows red light and blue light to pass through and reflects green light.

[Operation in the First Configuration of the Light Source Unit]

When one frame of a color image projected by the data projector apparatus 10 is composed of, for example, a total of three fields, an R (red) field, a G (green) field, and a B (blue) field, the projecting unit 13 drives the red-light-emitting LED 31, the LD array 42 that emits blue light for exciting green light, and the blue-light-emitting LED 39 cyclically in time division.

An operation in the G field will be mainly explained.

In the G field, a group of blue light beams emitted from the lens array 43 is magnified in the width of each light beam by the lens array 43. The magnified light beams pass through the dichroic mirror 35 and are narrowed down in the width of each light beam by the lens array 44. The resulting light beams are shed on the fluorescence plate 45.

Figure 3:
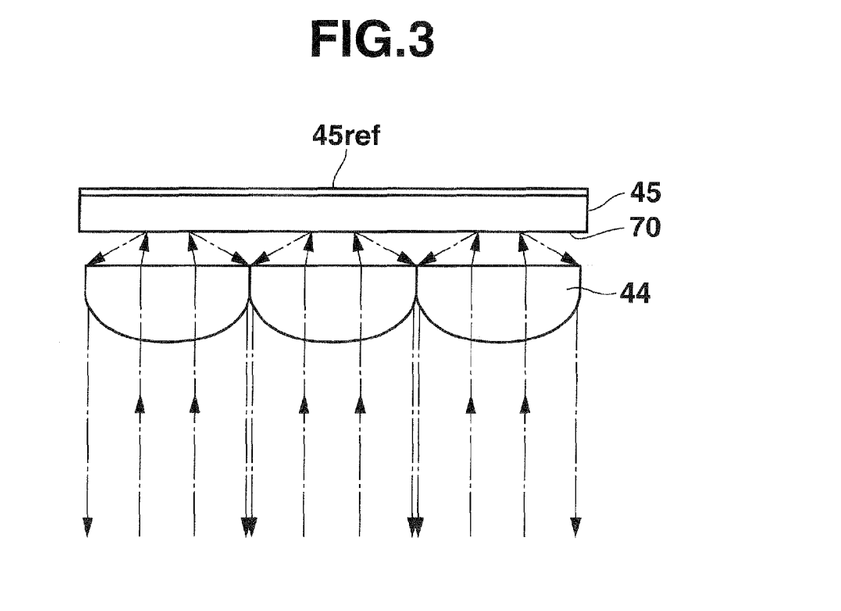
FIG. 3 shows the irradiation of blue light serving as excitation light at a lens array and a fluorescence plate according to the embodiment, and the emission of fluorescence light excited by the excitation light.

FIG. 3 schematically shows the irradiation of blue light serving as excitation light at the lens array 44 and fluorescence plate 45 and the emission of fluorescence light by the fluorescence layer 70 excited by the excitation light. Each of the lenses constituting the lens array 44 has a short focal length. The fluorescence plate 45 is arranged near the focal length.

In the fluorescence plate 45, a reflector 45 ref is formed on the back side of the fluorescence layer 70 as shown in FIG. 3. Green light beams generated by the irradiation of blue light beams, excitation light beams, are diffusely reflected toward the lens array 44. The lens array 44 collects the green light beams, shapes them into parallel light fluxes, and emits the parallel light fluxes toward the dichroic mirror 35.

Figure 4:
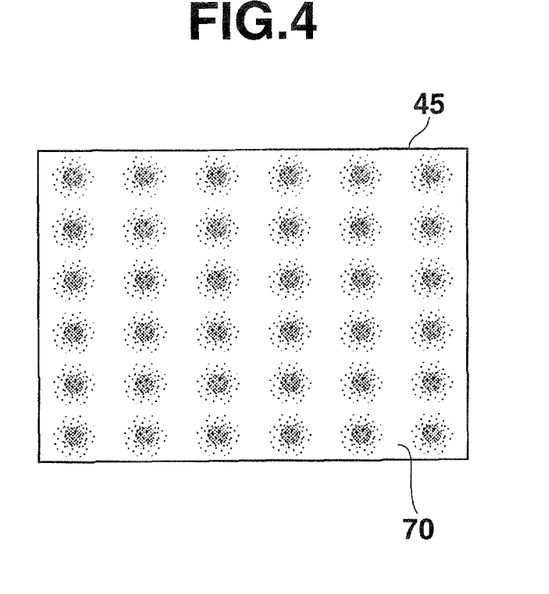
FIG. 4 shows fluorescence light generated by irradiating the fluorescence plate with excitation light according to the embodiment.
Figure 5:
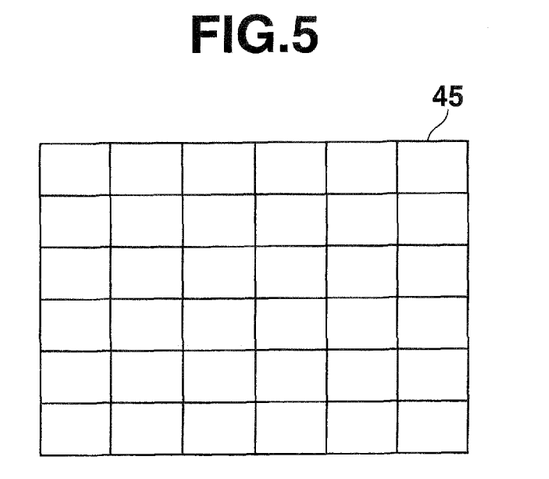
FIG. 5 shows corresponding segmented areas of the fluorescence plate produced by the lens array according to the embodiment.

FIG. 4 shows green fluorescence light beams as source light beams generated by irradiating the fluorescence plate 45 with the excitation light. As for fluorescence light beams generated in each irradiation position, the lens array 44 collects light beams from an area corresponding to each of the lenses and shapes the outgoing beams into parallel light the fluorescence plate 45 produced by the lens array 44.

At this time, since the fluorescence plate 45 arranged such that the fluorescence layer 70 lies substantially in the focal position of the lens array 44, the diffusion of each fluorescence light beam emitted from each area corresponding to each lens of the fluorescence layer 70 can be decreased, enabling the corresponding lens to collect light beams well, which enables the light-collecting efficiency to be increased.

The green source light beams shaped into parallel light beams so as to correspond to the entire surface of the projection screen are reflected by the dichroic mirror 35, pass through the lighting lens array 36 and field lens 37, are reflected by the mirror 16, pass through the field lens 38, and are shed on the micromirror element 14.

At this time, since the projecting unit 13 displays an image for green color with the micromirror element 14, the reflected light beams form a green optical image. The green optical image passes through the field lens 38 and is projected by the projector lens unit 17 on a screen or the like (not shown) as a projection object.

Figure 6:
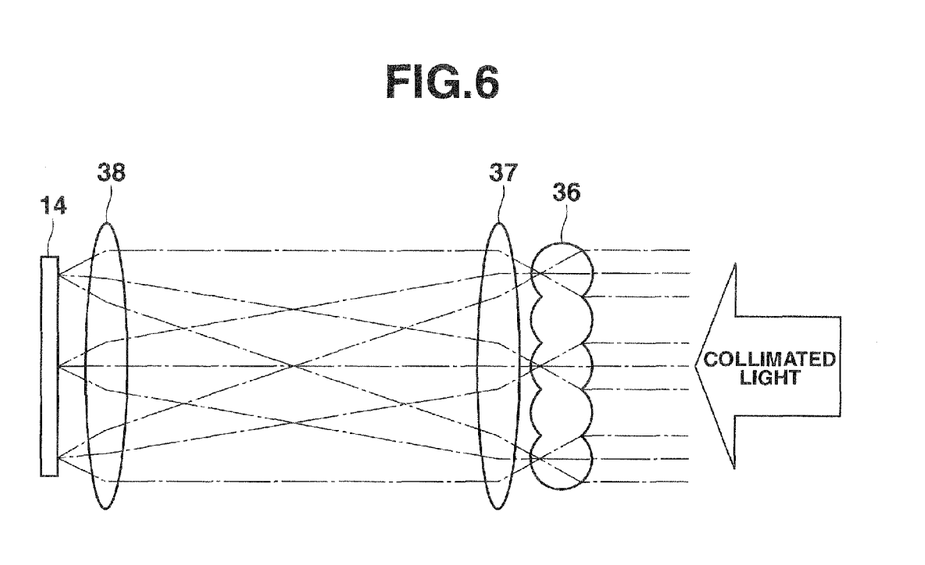
FIG. 6 shows optical paths between a lighting lens array and a micromirror element according to the embodiment.

FIG. 6 shows optical paths between the lighting lens array 36 and micromirror element 14. Although not shown in FIG. 6, the cross-sectional shape of the surface perpendicular to the optical axis of the source light is a rectangle as shown in FIGS. 4 and 5. The lenses constituting the lighting lens array 36 shaped like a rectangle as a whole are used to partially magnify light fluxes and superimpose them to generate source light to be shed on the micromirror element 14, thereby uniformizing the brightness distribution of source light shed on the micromirror element 14.

In the R field, red light beams emitted by the LED 31 are made substantially parallel by the lenses 32, 33. The parallel red light beams pass through the two dichroic mirrors 34, 35 and then are caused to enter the lighting lens array 36. The optical path after the lighting lens array 36 is the same as that of the C field.

In the B field, blue light beams emitted by the LED 39 are made substantially parallel by the lenses 40, 41. The parallel blue light beams are reflected by the dichroic mirror 34, pass through the dichroic mirror 35, and are caused to enter the lighting lens array 36. The optical path after the lighting lens array 36 is the same as that of the G field.

[Second Configuration of the Light Source Unit and its Operation]

A configuration of the optical system when the light source unit 15 is configured by three types of light-emitting elements will be explained with reference to FIG. 7.

Figure 2:
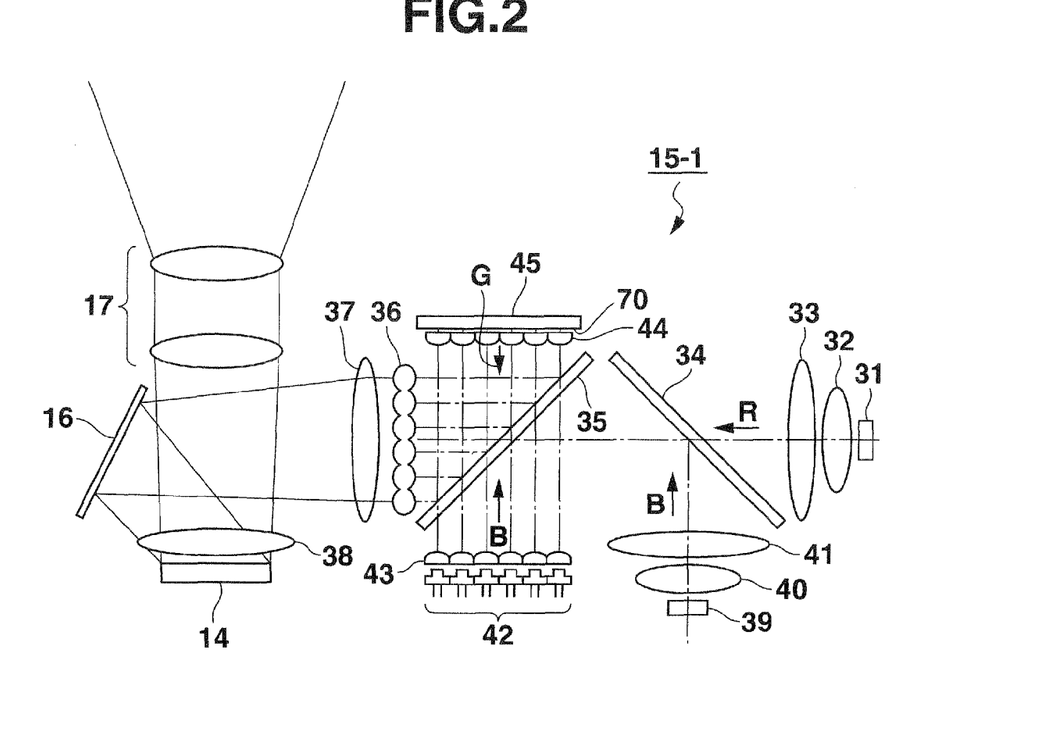
FIG. 2 shows a first configuration of a light-source unit according to the embodiment.
Figure 7:
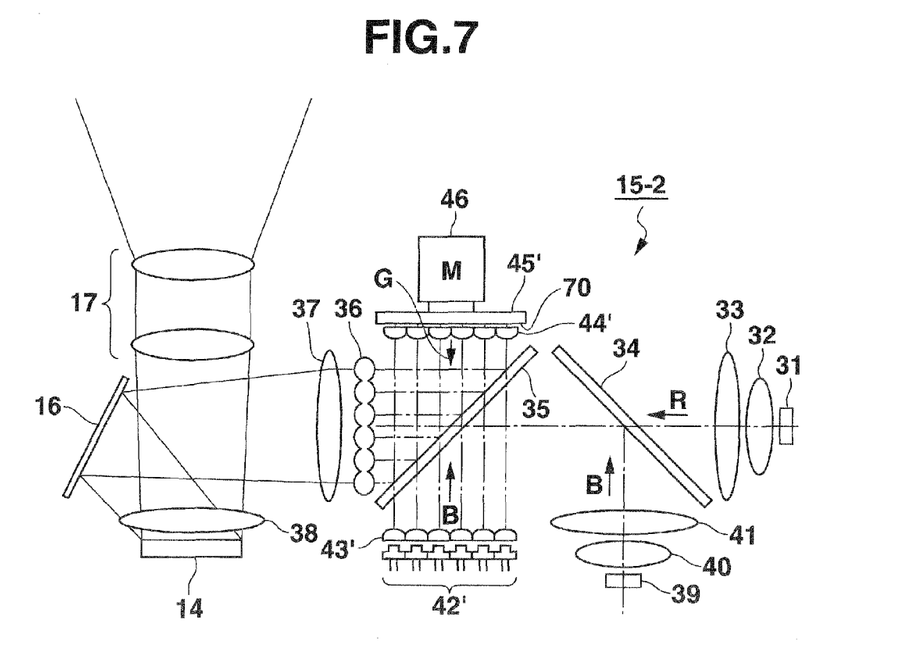
FIG. 7 shows a second configuration of the light source unit according to the embodiment.

A light source unit 15-2 shown in FIG. 7 has basically the same configuration as that of FIG. 2 and therefore the same parts are indicated by the same reference numerals and an explanation of them will be omitted.

In an LD array 42' that emits blue light beams for exciting the fluorescence layer 70 to generate green light beams, LDs are arranged so as to illuminate a circular area almost equally. For example, an LD at each of the four corners is removed from a 6×4 rectangular LD arrangement, with the result that a total of 20 LDs are arranged in an array.

A lens array 44' (a first lens array) has a similar arrangement to the configuration of the LD array 42'.

Figure 8:
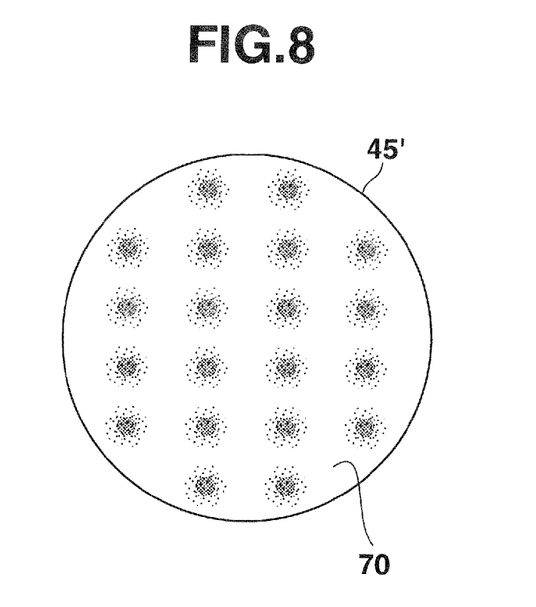
FIG. 8 shows a configuration of the fluorescence plate according to the embodiment and fluorescence light generated by the irradiation of excitation light.

A fluorescence plate 45' is configured to have a circular shape as shown in FIG. 8. In a projection operation of causing the LD array 42' to emit light, the fluorescence plate 45' is rotated by a motor (M) 46.

The light emitting operations of the LED 31, LD array 42', and LED 39 in the R, G, B fields and the paths of emitted light beams are the same as in the first configuration.

In the G field, as for a fluorescence plate 45' on which blue light beams, excitation light beams, from the LD array 42 are shed via the lens array 44', blue laser light beams are shed on the fluorescence plate 45', with the result that positions in which green fluorescence light beams are emitted are as shown in FIG. 8.

Since the fluorescence plate 45' is rotated by the motor 46 as described above, the position irradiated with the excitation light moves as the fluorescence plate rotates even during the G field period when viewed from the fluorescence plate 45' side.

Therefore, even when the irradiation density of the laser light beams on the fluorescence plate has been increased, the positions of spots irradiated with laser light beams are dispersed as shown in the configuration of FIG. 2. This combines with the movement of the positions irradiated with the excitation light beams to remarkably reduce the possibility that specific irradiation spots on the fluorescence plate 45' will be deteriorated or damaged by thermal loads.

[Third Configuration of the Light Source Unit]

A configuration of the optical system when the light source unit 15 is configured by two types of light-emitting elements will be explained with reference to FIG. 9.

A light source unit 15-3 includes an LED 51 that emits blue light beams as source light beams. The blue light beams emitted by the LED 51 pass through lenses 52, 53 that function as collimator lenses and further pass through a dichroic mirror 54, and then reaches the mirror 16 via a lighting lens array 55 and a field lens 56.

The blue light beams reflected by the mirror 16 pass through a field lens 57 and are shed on the micromirror element 14. A blue optical image formed by the reflected light from the micromirror element 14 passes through the field lens 57 and is projected on a screen (not shown) by the projection lens unit 17.

The light source unit 15-3 further includes an LD array 58 that emits red light beams and blue light beams for exciting green light beams.

In the LD array 58, for example, 6×6 LDs (in the vertical direction in FIG. 9), a total of 36 LDs, are arranged in an array.

The blue laser light beams emitted by the LD array 58 are magnified in their fluxes via a lens array 59 (a second lens array). The magnified laser light beams pass through the dichroic mirror 54 and are shed on a fluorescence plate 61 via a lens array 60 (a first lens array) configured to have the same arrangement as that of the lens array 59 so as to face the lens array 59.

The lens array 59 fine-adjusts the direction in which each light beam emitted from the corresponding LD of the LD array 58 travels. These light beams enter the individual lenses of the lens array 60 suitably in the form of parallel light beams, which increases the light focusing efficiency.

The fluorescence plate 45 is arranged such that the fluorescence layer lies substantially in the focal position of the lens array 60.

The fluorescence plate 61 has two types of fluorescence layers formed checkerwise on the entire surface. Specifically, as for the entire surface at which the fluorescence layer of the fluorescence plate 61 is formed, two types of fluorescence substances are applied to the surface irradiated with blue laser beams from the LD array 58 so as to arrange divisions alternately to form a checkered pattern, thereby forming a fluorescence layer as a whole. On the back side of the surface at which the fluorescence layer has been formed, a reflecting plate is provided so as to be on top of the fluorescence layer. That is, a fluorescence layer (a first fluorescence substance) 71 that emits green light beams when being irradiated with blue light beams and a fluorescence layer (a second fluorescence substance) 72 that emits red light beams when being irradiated with blue light beams are applied to the fluorescence plate 61 so as to arrange divisions alternately to form a checkered pattern. When the fluorescence layer of the fluorescence plate 61 is irradiated with blue laser light beams from the LD array 58, the fluorescence layer emits red light beams and green light beams as fluorescence light beams with a desired wavelength. These fluorescence light beams are also used as source light beams.

The red and green light, beams, diffusion light beams, emitted from the fluorescence plate 45 are uniformly directed by the reflecting plate formed on the underside of the fluorescence plate 61 toward the lens array 60, and are collected by the lens array 60 to form substantially parallel light fluxes, which are then reflected by the dichroic mirror 54. After that, the red and green light beams pass through the lighting lens array 55 and field lens 56 and reach the mirror 16.

As described above, the dichroic mirror 54 allows blue light to pass through and reflects red light and green light.

It is assumed that the individual LDs constituting the LD array 42 are provided for two types of fluorescence substances divided checkerwise on the fluorescence plate 45 in a one-to-one correspondence and that the LDs can be driven according to a checkered light-emitting pattern that prevents adjacent LDs from emitting light at the same time.

[Operation in the Third Configuration of the Light Source Unit]

When one frame of a color image projected by the data projector apparatus 10 is composed of, for example, a total of three fields, a B (blue) field, a (green) field, and an B (red) field, the projecting unit 13 drives the blue-light-emitting LED 51, half of the LDs of the LD array 58 that emit blue light beams for exciting green color, and the remaining half of the LDs of the SD array 58 that emit blue light beams for exciting red color cyclically in time division.

In the B field, blue light beams as source light beams emitted by the LED 51 are made substantially parallel by the lenses 52, 53. The parallel blue light beams pass through the dichroic mirror 54 and are shed on the lighting lens array 55.

In the lighting lens array 55, the individual lenses constituting the lighting lens array 55 partially magnify the light fluxes, superimpose them, and output the resulting blue light beams. The emitted blue light beams are reflected by the mirror 16, pass through the field lens 57, and are shed on the micromirror element 14.

At this time, the projecting unit 13 displays an image for flue color with the micromirror element 14. Therefore, a blue optical image is formed by the reflected light and is projected by the projection lens unit 17 on a screen or the like (not shown) as a projection object.

In the G field, a group of blue light beams emitted from half of the LOs constituting the LD array 58 is magnified in the width of light beam by the lens array 59. She magnified blue light beams pass through the dichroic mirror 54, are narrowed down in the width of light beam by the lens array 60, and are shed on the fluorescence plate 61.

Figure 10A:
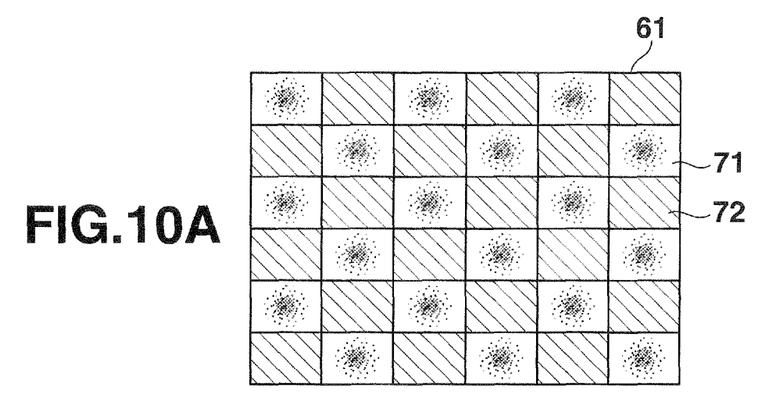
FIG. 10A shows a configuration of the fluorescence plate according to the embodiment and green fluorescence light generated by the irradiation of excitation light.

FIG. 10A shows green fluorescence light generated by irradiating the fluorescence plate 61 with excitation light. With respect to the green fluorescence light beams generated in irradiation positions dispersed checkerwise, light beams from areas corresponding to the individual lenses are collected by the lens array 60, and the outgoing light beams from the lens array 60 are shaped into parallel light beams.

Since the fluorescence plate 61 has been arranged such that the fluorescence layer 71 lies substantially in the focal position of the lens array 60, the diffusion of each green fluorescence light beam emitted from each area corresponding to each lens of the fluorescence layer 71 can be decreased, enabling the corresponding lens to collect the light beam well, which enables the light-collecting efficiency to be increased.

The green fluorescence light beams shaped into parallel light beams are partially magnified in their light fluxes and superimposed by the individual lenses constituting the lighting lens array 55, which then emits the resulting green fluorescence light. The emitted green fluorescence light is reflected by the mirror 16, passes through the field lens 57, and is shed on the micromirror element 14.

Since the projecting unit 13 displays an image for green color with the micromirror element 14, the reflected light beams form a green optical image. The green optical image passes through the field lens 57 and is projected by the projector lens unit 17 on a screen or the like (not shown) as a projection object.

In the P field, a group of blue light beams emitted from the remaining half of the LDs constituting the LD array 58 is magnified in the width of light beam by the lens array 59. The magnified blue light beams pass through the dichroic mirror 54, are narrowed down in the width of light beam by the lens array 60, and are shed on the fluorescence plate 61.

Figure 10B:
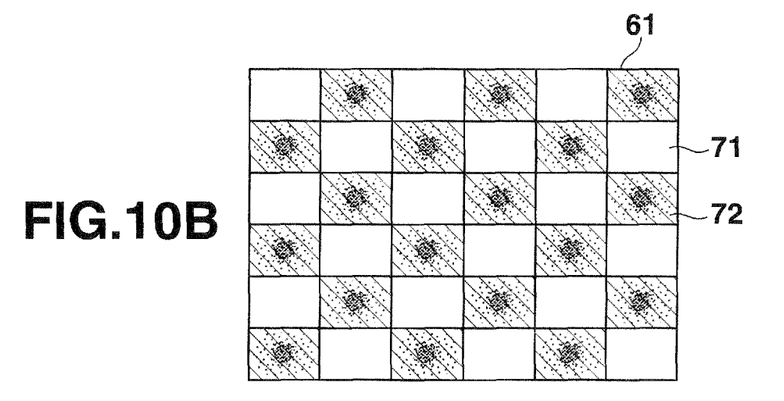
FIG. 10B shows a configuration of the fluorescence plate according to the embodiment and red fluorescence light generated by the irradiation of excitation light.

FIG. 10B shows red fluorescence light generated by irradiating the fluorescence plate 61 with excitation light. With respect to the red fluorescence light beams generated in irradiation positions dispersed checkerwise so as to interpolate the positions shown in FIG. 10A, light beams from areas corresponding to the individual lenses are collected by the lens array 60, and the outgoing light beams from the lens array 60 are shaped into parallel light beams.

Since the fluorescence plate 61 has been arranged such that the fluorescence layer 72 lies substantially in the focal position of the lens array 60, the diffusion of each red fluorescence light beam emitted from each area corresponding to each lens of the fluorescence layer 72 can be decreased, enabling the corresponding lens to collect the light beam well, which enables the light-collecting efficiency to be increased.

The red fluorescence light beams shaped into parallel light beams are partially magnified in their light fluxes and superimposed by the individual lenses constituting the lighting lens array 55, which then emits the resulting red fluorescence light. The emitted red fluorescence light is reflected by the mirror 16, passes through the field lens 57, and is shed on the micromirror element 14.

Since the projecting unit 13 displays an image for red color with the micromirror element 14, the reflected light beams form a red optical image. The red optical image passes through the field lens 57 and is projected by the projector lens unit 17 on a screen or the like (not shown) as a projection object.

In the above operation examples, one frame of a color image has been composed of a total of three fields, a B (blue) field, a G (green) field, and an R (red) field. In addition to these primary color fields, complementary fields irradiated with complementary light beams may be provided to increase the brightness of a projection image and produce finer color tones.

For example, a field where all the LDs constituting the LD array 58 are caused to emit light is considered. In this case, the operations explained in the G field and P field are performed simultaneously. Therefore, green light and red light generated at the fluorescence plate 61 are both reflected by the dichroic mirror 54 and reach the lighting lens array 55, which produces Y (yellow) light by color mixture.

At this time, the micromirror element 14 displays an image corresponding to yellow or white source light as a Y field if the LED 51 is not emitting blue light, and a W (white) field by color mixture if the LED 51 is emitting blue light, with the result that the reflected light forms a yellow or white optical image, which is projected by the projection lens unit 17.

Figure 10C:
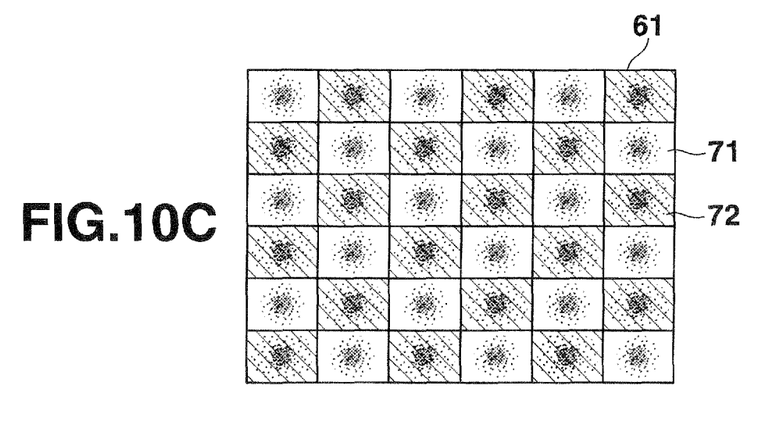
FIG. 10C shows a configuration of the fluorescence plate according to the embodiment and green and red fluorescence lights generated by the irradiation of excitation light in a Y field or a W field.

FIG. 10C shows fluorescence light as green and red source lights generated by irradiating the fluorescence plate 61 with excitation light in the Y field or W field. As described above, green light and red light generated in the irradiation positions of two types of fluorescence substances 71, 72 dispersed checkerwise so as to interpolate one another's positions are shaped into parallel light beams by the lens array 60, which emits the parallel light beams.

[Fourth Configuration of the Light Source Unit]

A configuration of the optical system when the light source unit 15 is configured by two types of light-emitting elements will be explained with reference to FIG. 11.

Figure 9:
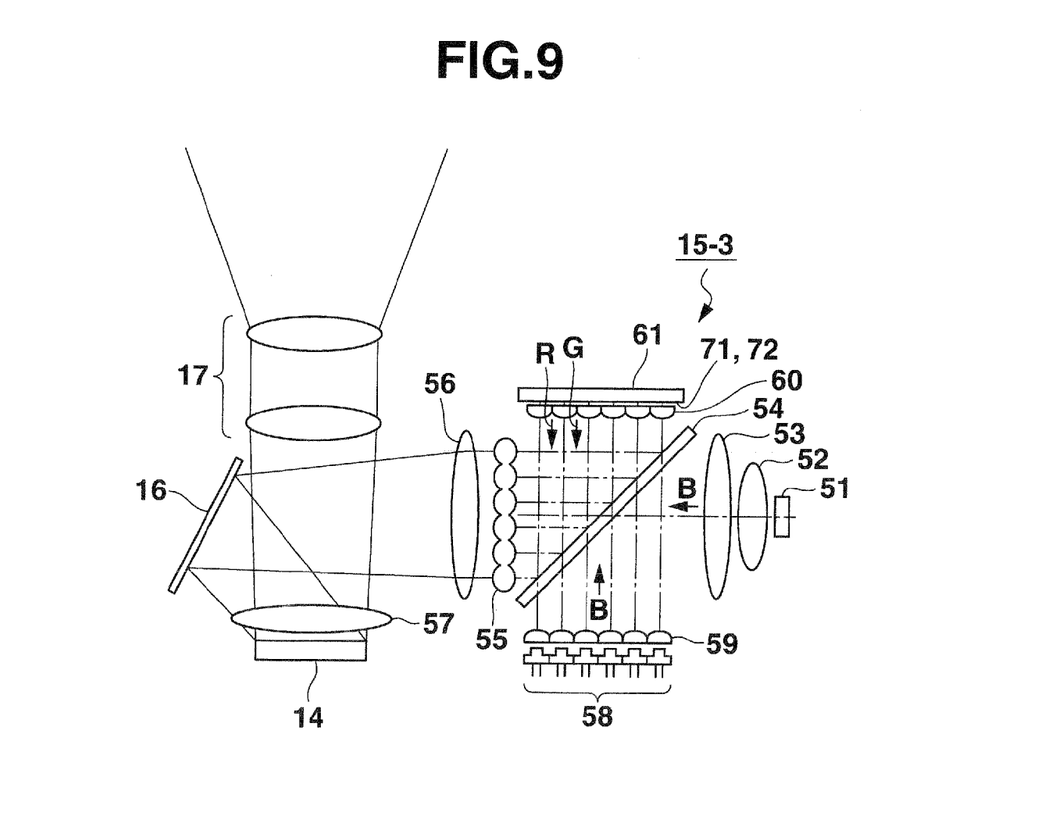
FIG. 9 shows a third configuration of the light source unit according to the embodiment.
Figure 11:
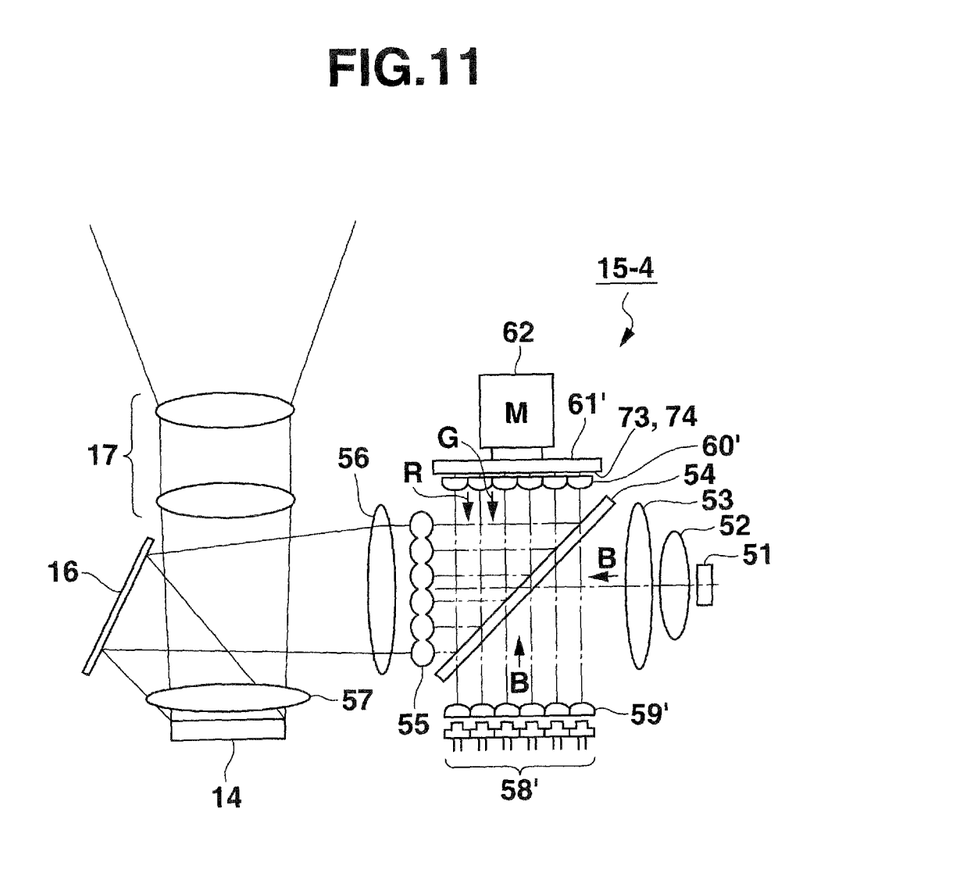
FIG. 11 shows a fourth configuration of the light source unit according to the embodiment.

A light source unit 15-4 shown in FIG. 11 has basically the same configuration as that of FIG. 9 and therefore the same parts are indicated by the same reference numerals and an explanation of them will be omitted.

In an LD array 58' that emits blue light beams for exciting a fluorescence layer to generate red and green light beams, a plurality of LDs are arranged in an array in each of two areas that divide a round shape concentrically. Specifically, for example, an LD array that emits exciting blue light for emitting green light is arranged in an inner circular area in a double concentric circle and an LD array that emits exciting blue light for emitting red light is arranged in an outer ring-shaped area.

A lens array 59' (a second lens array) has a similar arrangement to the configuration of the LD array 58'.

Figure 12A:
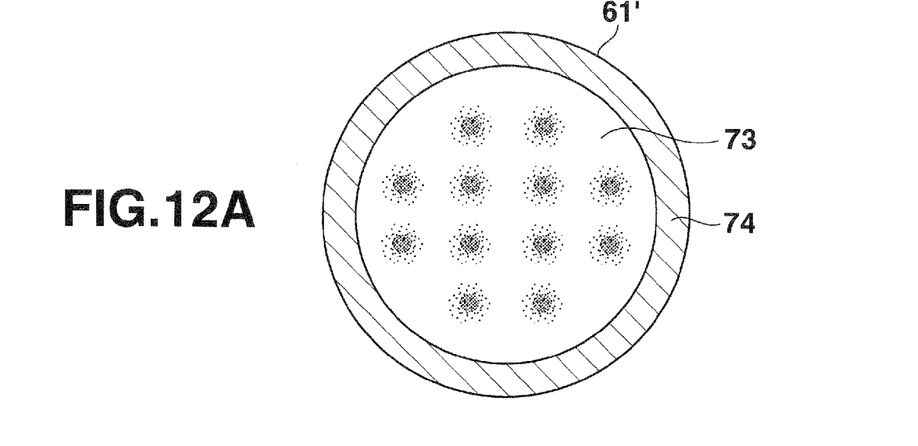
FIG. 12A shows a configuration of the fluorescence plate according to the embodiment and green fluorescence light generated by the irradiation of excitation light.
Figure 12B:
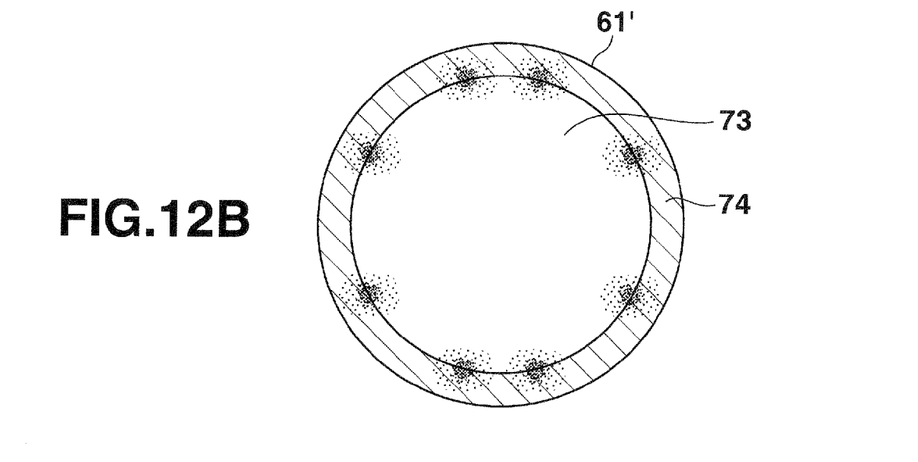
FIG. 12B shows a configuration of the fluorescence plate according to the embodiment and red fluorescence light generated by the irradiation of excitation light.
Figure 12C:
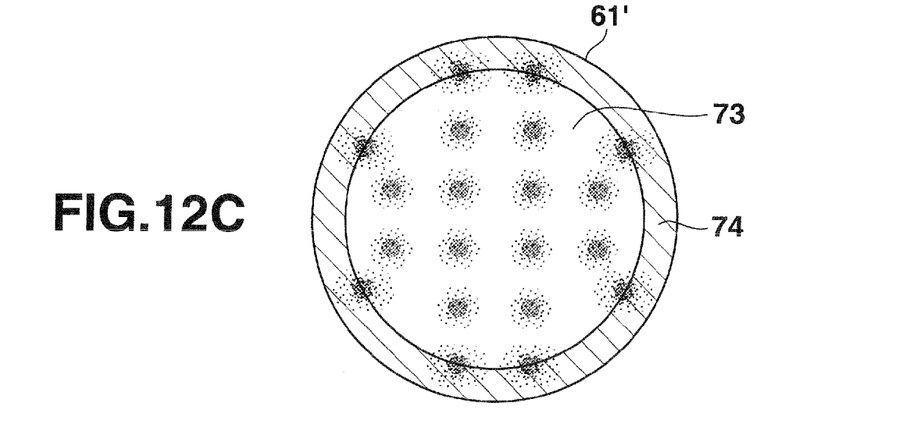
FIG. 12C shows a configuration of the fluorescence plate according to the embodiment and green and red fluorescence lights generated by the irradiation of excitation light in a Y field or a W field.

A fluorescence plate 61' is configured to have a circular shape as shown in FIGS. 12A, 12B, and 12C in accordance with the configurations of the LD array 58', lens array 59', and lens array 60' (a first lens array). In this case, in the fluorescence, plate 61', fluorescence layer is formed in each of the two areas that divide the round shape concentrically. The fluorescence layers in the two areas differ from each other.

Specifically, for example, a fluorescence layer (a first fluorescence substance) 73 that emits green light when being irradiated with blue light is formed in the inner circular area (a first area) in the double concentric circle and a fluorescence layer (a second fluorescence substance) 74 that emits red light when being irradiated with blue light is formed in the outer ring-shaped area (a second area). The fluorescence plate 61' is rotated by a motor (M) 62 when the LD array 58' is caused to emit light in a projecting operation.

[Operation in the Fourth Configuration of the Light Source Unit]

When one frame of a color image projected by the data projector apparatus 10 is composed of, for example, a total of three fields, a B (blue) field, a G (green) field, and an R (red) field, the projecting unit 13 drives the blue-light-emitting LED 51, a part of the LDs of the LD array 58 that emit blue light beams for exciting green color, and the remaining LDs of the LD array 58 that emit blue light beams for exciting red color cyclically in time division.

In the B field, blue light beams emitted by the LOP 51 are made substantially parallel by the lenses 52, 53. The parallel blue light beams pass through the dichroic mirror 54 and are shed on the lighting lens array 55. In the lighting lens array 55, the individual lenses constituting the lighting lens array 55 partially magnify the light fluxes, superimpose them, and output the resulting blue light beams as source light. The emitted blue light beams are reflected by the mirror 16, pass through the field lens 57, and are shed on the micromirror element 14.

At this time, the projecting unit 13 displays an image for blue color with the micromirror element 14. Therefore, a blue optical image is formed by the reflected light, passes through the field lens 57, and is projected by the projection lens unit 17 on a screen or the like (not shown) as a projection object.

In the G field, a group of blue light beams emitted from a part of the LD array 58, specifically, the LDs arranged in the inner circular area of the double concentric circle, is magnified in the width of light beam by the lens array 59'. The magnified blue light, beams pass through the dichroic mirror 54, are narrowed down in the width of light beam by the lens array 60', and are shed on the fluorescence plate 61'.

FIG. 12A shows green fluorescence light generated by irradiating the fluorescence plate 61' with excitation light. With respect to the green fluorescence light beams generated in irradiation positions of the fluorescence layer 73 formed in the inner circular area of the double concentric circle, light beams from areas corresponding to the individual lenses are collected by the lens array 60', and the outgoing light beams from the lens array 60' are shaped into parallel light beams.

The green fluorescence light beams shaped into parallel light beams are partially magnified in their light fluxes and superimposed by the individual lenses constituting the lighting lens array 55, which then emits the resulting green fluorescence light beams. The emitted green fluorescence light beams are reflected by the mirror 16, pass through the field lens 57, and are shed on the micromirror element 14.

Since the projecting unit 13 displays an image for green color with the micromirror element 14, the reflected light beams form a green optical image. The green optical image passes through the field lens 57 and is projected by the projector lens unit 17 on a screen or the like (not shown) as a projection object.

In the R field, a group of blue light beams emitted from the remaining IDs constituting the LD array 58, specifically, from the LDs in the outer ring-shaped area in the double concentric circle, is magnified in the width of light beam by the lens array 59'. The magnified blue light beams pass through the dichroic mirror 54, are narrowed down in the width of light beam by the lens array 60', and are shed on the fluorescence plate 61'.

FIG. 12B shows red fluorescence light beams generated by irradiating the fluorescence plate 61' with excitation light. With respect to the red fluorescence light beams generated in irradiation positions of the fluorescence layer 74 formed in the outer ring-shaped area in the double concentric circle, light beams from areas corresponding to the individual lenses are collected by the lens array 60', and the outgoing light beams from the lens array 60' are shaped into parallel light beams.

The red fluorescence light beams shaped into parallel light beams are partially magnified in their light fluxes and superimposed by the individual lenses constituting the lighting lens array 55, which then emits the resulting red fluorescence light beams. The emitted red fluorescence light beams are reflected by the mirror 16, pass through the field lens 57, and are shed on the micromirror element 14.

Since the projecting unit 13 displays an image for red color with the micromirror element 14, the reflected light beams form a red optical image. The red optical image passes through the field lens 57 and is projected by the projector lens unit 17 on a screen or the like (not shown) as a projection object.

In the above operation examples, one frame of a color image has been composed of a total of three fields, a B (blue) field, a C (green) field, and an R (red) field. In addition to these primary color fields, complementary fields irradiated with complementary light beams may be provided to increase the brightness of a projection image and produce finer color tones.

For example, a field where all the LDs constituting the LD array 58' are caused to emit light is considered. In this case, the operations explained in the G field and R field are performed simultaneously. Therefore, green light and red light generated at the fluorescence plate 61' are both reflected by the dichroic mirror 54 and reach the lighting lens array 55, which produces Y (yellow) light by color mixture.

At this time, the micromirror element 14 displays an image corresponding to yellow or white light as a Y field if the LED 51 is not emitting blue light as source light, and a W (white) field by color mixture if the LED 51 is emitting blue light, with the result that the reflected light forms a yellow or white optical image, which is projected by the projection lens unit 17.

FIG. 12C shows green and red fluorescence light beams generated by irradiating the fluorescence plate 61' with excitation light in the Y field or W field. As described above, green light and red light beams generated in the irradiation positions of fluorescence substances 73, 74 differing in radius positions of concentric circles are shaped into parallel light beams by the lens array 60, which emits the parallel light beams.

Since the fluorescence plate 61' is rotated by the motor 62 as described above, the position irradiated with the excitation light moves according to the rotation even in either the G field period or R field period (or in either the Y field period or W field period) when viewed from the fluorescence plate 61'.

Therefore, even when the irradiation density of the laser light on the fluorescence substance has been increased, the movement of the irradiation position together with the dispersion of spot positions irradiated with the laser light described in the configuration of FIG. 9 makes it possible to remarkably decrease the possibility that specific irradiation spots of the fluorescence plate 61' will be deteriorated or damaged by thermal loads.

As described in detail with reference to the first to fourth configurations of the light source unit and their operations, the embodiment makes it possible to reliably suppress the deterioration or damage of a fluorescence substance for generating light in a desired waveband upon irradiation of excitation light, while simplifying the mechanical structure of the light source system as much as possible.

In addition, in the embodiment, as explained in the second and fourth configurations of the light source unit, the mechanisms that rotate the fluorescence plates 45', 61' have been further provided, which makes it possible to remarkably reduce the possibility that specific irradiation spots of the fluorescence plate will be deteriorated or damaged due to thermal loads.

Moreover, in the embodiment, as explained in the third and fourth configurations of the light source unit, fluorescence layers 71, 72, 73, 74 in which a plurality of different types of fluorescence substances differing in wavelength of emitted light are divided and arranged are formed and the light-emitting timing of the LDs constituting the LD arrays 58, 58' is switched to correspond with the divided areas. This realizes a light source unit that emits multiple colors, while making the configuration of the system more compact.

As explained in the first to fourth configurations of the light source unit, since the lens arrays 43, 43', 59, 59' have been provided on the side of the fluorescence plates of the LD arrays 42, 42', 58, 58', respectively, the direction in which each of the light beams emitted from the LDs of the LD array 42 is fine-adjusted, causing the light beams to enter the individual lenses of the lens array 44 suitably in the form of parallel light beams, which increases the light-collecting efficiency.

In addition, as explained in the first to fourth configurations of the light source unit, since the fluorescence plate has been arranged such that the fluorescence layers 70, 71, 72, 73, 74 lie substantially in the focal positions of the lens arrays 44, 44', 60, 60', respectively, the diffusion of fluorescence light beams emitted from the corresponding area for each lens of the fluorescence layers 70, 71, 71, 73, 74 can be decreased, causing the corresponding lens to collect light beams better, which increases the light-collecting efficiency.

Moreover, when an LD, an LED, a fluorescence plate, or a dichroic mirror has been arranged as explained in the first to fourth configurations of the light source unit, this arrangement contributes toward making the light source unit more compact.

While in the embodiment, the invention has been applied to the DPL (a registered trademark) data projector apparatus, it does not limit display elements or the like for forming an optical image and may be applied to, for example, a field-sequential projection device using a transmissive monochrome liquid-crystal panel.

In the third and fourth configurations of the light source unit, the user can set freely the number of LDs for exciting green color and the number of LDs for exciting red color in the LD array 58 that emits blue light beams in addition to the number of LDs for exciting green color and the number of LDs for exciting red color in the LD array 58 that emits blue light beams.

For example, if the user wants to increase the brightness of green light, he or she has only to increase the area of the fluorescence layer for exciting green color and increase the number of LDs for excising green color that shed light on the area. If the user wants to increase the brightness of red light, he or she has only to increase the area of the fluorescence layer for exciting red color and increase the number of LDs for excising red color that shed light on the area. By doing this, the user can adjust a desired brightness of light freely.

The present invention is not limited to the above embodiments and, on the basis of available skills in the present or future implementation phase, may be modified variously without departing from the spirit or essential character thereof. The functions implemented in the embodiments may be combined suitably as much as possible. The embodiments include inventions of different stages and therefore various inventions can be extracted by combining suitably a plurality of structural requirements disclosed in the embodiments. For example, even if some are removed from all of the structural requirements shown in the embodiments, the resulting configuration can be extracted as an invention, provided that the effect of the invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a light source including a plurality of light-emitting elements arranged in an array and configured to emit excitation lights;
   a fluorescence plate including a fluorescence layer configured to emit fluorescence light beams upon irradiation of the excitation lights;
   a first lens array, provided on a light source side of the fluorescence plate and including a plurality of lenses arranged in an array to correspond with the light-emitting elements, and configured to collect the fluorescence light beams and emit the fluorescence light beams to be parallel with one another; and
   a projection unit configured to form an optical image using the fluorescence light beams obtained via the first lens array and project the optical image on a projection object.

2. The projection apparatus according to claim 1, wherein:
   the fluorescence plate includes a fluorescence layer in which a plurality of different types of fluorescence substances differing in wavelength of emitted fluorescence light are divided and arranged, and
   the light-emitting elements of the light source switch light-emitting timing to correspond with the different types of fluorescence substances divided and arranged on the fluorescence plate.

3. The projection apparatus according to claim 2, wherein:
   the different types of fluorescence substances differing in wavelength of emitted fluorescence light include a first fluorescence substance and a second fluorescence substance differing from each other in wavelength of emitted fluorescence light, and
   the first fluorescence substance and the second fluorescence substance are arranged in a checker pattern.

4. The projection apparatus according to claim 2, wherein:
   a surface of the fluorescence plate on which the fluorescence layer has been formed includes a first area formed on an inner side of the fluorescence plate and a second area formed outside the first area,
   the different types of fluorescence substances differing in wavelength of emitted fluorescence light include a first fluorescence substance and a second fluorescence substance differing from each other in wavelength of emitted fluorescence light, and
   the first fluorescence substance is formed in the first area of the fluorescence plate and the second fluorescence substance is formed in the second area of the fluorescence plate.

5. The projection apparatus according to claim 2, wherein the light-emitting elements of the light source emit excitation lights simultaneously toward the different types of fluorescence substances divided and arranged on the fluorescence plate.

6. The projection apparatus according to claim 1, wherein the fluorescence plate is arranged such that the fluorescence layer lies substantially in a focal position of the first lens array.

7. The projection apparatus according to claim 1, further comprising a second lens array including a plurality of lenses arranged in an array on a fluorescence plate side of the light source to correspond with the light-emitting elements, and configured to emit the excitation light beams from the light source to be parallel with one another toward the fluorescence plate.

8. The projection apparatus according to claim 1, further comprising a rotating mechanism configured to rotate the fluorescence plate.

9. The projection apparatus according to claim 1, wherein the fluorescence plate further includes a reflecting plate on a back side of a surface on which the fluorescence layer has been formed.

10. The projection apparatus according to claim 1, wherein the fluorescence layer is formed on an entire surface of the fluorescence plate.

* * * * *